United States Patent
Abou Mahmoud et al.

(10) Patent No.: US 9,721,288 B2
(45) Date of Patent: *Aug. 1, 2017

(54) CREDIBILITY ENHANCEMENT FOR ONLINE COMMENTS AND RECOMMENDATIONS

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,300

(22) Filed: Sep. 28, 2016

(65) Prior Publication Data

US 2017/0186069 A1    Jun. 29, 2017

Related U.S. Application Data

(63) Continuation of application No. 14/983,373, filed on Dec. 29, 2015, now Pat. No. 9,507,831.

(51) Int. Cl.
*G06F 17/30* (2006.01)
*G06Q 30/06* (2012.01)
*G06Q 50/00* (2012.01)

(52) U.S. Cl.
CPC ..... *G06Q 30/0631* (2013.01); *G06F 17/3053* (2013.01); *G06F 17/3097* (2013.01); *G06Q 50/01* (2013.01)

(58) Field of Classification Search
CPC ............ G06F 17/3053; G06F 17/3097
See application file for complete search history.

(56) References Cited

U.S. PATENT DOCUMENTS 6,236,980 B1    5/2001  Reese
6,895,385 B1    5/2005  Zacharia
(Continued)

FOREIGN PATENT DOCUMENTS

CN    104636947 A    5/2015
CN    103136330 B    9/2015
JP    2009265914 A    11/2009

OTHER PUBLICATIONS

Ratkiewicz, J. et al., "Truthy: Mapping the Spread of Astroturf in Microblog Streams", Proceedings of the 20th International Conference Companion on World Wide Web (WWW'11), Mar. 28, 2011, pp. 249-252, ACM, United States.
(Continued)

*Primary Examiner* — Kris Mackes
(74) *Attorney, Agent, or Firm* — Sherman IP LLP; Kenneth L. Sherman; Hemavathy Perumal

(57) ABSTRACT

One embodiment provides a method for determining credibility of a user in recommending an object. The method comprises monitoring activity relating to an object in an online network, and determining a baseline of activity for the object based on the activity monitored. In response to detecting a user interaction by a first user with the object, information relating to the user interaction is recorded. An analysis of the information recorded is performed in view of information relating to one or more other user interactions by one or more other users with the object. Based on the analysis, a credibility score for the first user is determined. The credibility score represents a degree of confidence in reliability of the first user to recommend the object. Presentation of user recommendations for objects is controlled based on credibility scores to decrease impact of astroturfing, crowdturfing and spamming on the presentation.

1 Claim, 3 Drawing Sheets

(56) References Cited

U.S. PATENT DOCUMENTS

| | | | |
|---|---|---|---|
| 7,519,562 | B1 | 4/2009 | Vander Mey |
| 7,552,068 | B1 | 6/2009 | Brinkerhoff |
| 7,958,119 | B2 | 6/2011 | Eggink et al. |
| 8,112,403 | B2 | 2/2012 | Repasi |
| 8,126,882 | B2 | 2/2012 | Lawyer |
| 8,862,492 | B1 | 10/2014 | Kulshreshtha |
| 9,009,082 | B1 | 4/2015 | Marshall et al. |
| 9,111,281 | B2 | 8/2015 | Stibel |
| 2013/0218788 | A1 | 8/2013 | Terheggen |
| 2014/0019221 | A1 | 1/2014 | Robinson |
| 2014/0026048 | A1 | 1/2014 | Spirer |
| 2014/0259189 | A1 | 9/2014 | Ramachandran |
| 2014/0330669 | A1 | 11/2014 | Bruce et al. |
| 2015/0120583 | A1 | 4/2015 | Zarrella |

OTHER PUBLICATIONS

Wang, G. et al., "Serf and Turf: Crowdturfing for Fun and Profit", Proceedings of the 21st International Conference on World Wide Web (WWW'12), Apr. 16, 2012, pp. 679-688, ACM, United States.

Boshmaf, Y. et al., "The Socialbot Network: When Bots Socialize for Fame and Money", Proceedings of the 27th Annual Computer Security Applications Conference (ACSAC'11), Dec. 5, 2011, pp. 93-102, ACM, United States.

Yang, C. et al., "Analyzing Spammers' Social Networks for Fun and Profit—A Case Study of Cyber Criminal Ecosystem on Twitter", Proceedings of the 21st International Conference on World Wide Web (WWW'12), Apr. 16, 2012, pp. 71-80, ACM, United States.

Budak, C. et al., "Structural Trend Analysis for Online Social Networks", Proceedings of the VLDB Endowment, Jul. 1, 2011, pp. 646-656, vol. 4, Issue 10, ACM, United States.

Lee, K. et al., "Detecting Collective Attention Spam", Proceedings of the 2nd Joint WICOW/AIRweb Workshop on Web Quality (WebQuality'12), Apr. 16, 2012, pp. 48-55, ACM, United States.

Qazvinian, V. et al., "Rumor has it: Identifying Misinformation in Microblogs", Proceedings of the Conference on Empirical Methods in Natural Language Processing (EMNLP'11), Jul. 27, 2011. pp. 1589-1599, ACM, United States.

DilogR LLC, "DilogR—Video Marketing Engagement Platform", Mar. 11, 2014, pp. 1-7, [downloaded from http://dilogr.com/ on Dec. 15, 2015], United States.

Digital Splash Media,"Viewer Abandonment Rate for Video Infographice", Jan. 2, 2013, pp. 1-3, [downloaded from http://digitalsplashmedia.com/2013/01/viewer-abandonment-rates-for-video-infographics/ on Dec. 15, 2015], United States.

List of IBM Patents or Patent Applications Treated as Related Form.

CREDIBILITY ENHANCEMENT FOR ONLINE COMMENTS AND RECOMMENDATIONS

The present invention generally relates to recommendation systems, and more particularly, a recommendation system for detecting correctness of a recommendation.

BACKGROUND

Online social networks are the universal mechanism to connect people and information in logical and organized ways which enable sharing and processing of information between the users. The most common mechanisms of sharing and processing of information is the inbox, wall, activity stream, timeline, or profile.

One of the most frequent types of social sharing is done via recommendations (e.g., Likes, Thumbs Up, Multi Modal Recommendations such as star ratings, emojis indicating likes/dislikes, etc.). Recommendations drive a wealth of discovery in online social networks, and in object/product centric views (e.g., a product page on site Amazon.com). Some recommendations often suffer/contain instant-read bias, where a user quickly scans over a few lines or frames of a video, and decides to either recommend or not recommend the video (e.g., down vote or up vote the video).

Recommendations are a powerful tool for agreeing or disagreeing to the mode of a topic, sharing a topic with others, commenting on a topic, or promoting a topic. Recently, however, marketing entities have begun to leverage the powerful tool to self-promote through the interconnected recommendation and social network systems so that they can drive success of their products. This practice is often referred to as astroturfing; astroturfing is the act of making an effort appear to be organic and grassroots based.

SUMMARY

The present invention generally relates to recommendation systems, and more particularly, a recommendation system for detecting correctness of a recommendation. The method comprises monitoring activity relating to an object in an online network, and determining a baseline of activity for the object based on the activity monitored. In response to detecting a user interaction by a first user with the object, information relating to the user interaction is recorded. The information recorded includes at least one of the following: length of time of the user interaction, degree of user engagement with the object during the user interaction, amount of the object the user interaction involved, and degree of user usage of the object during the user interaction. An analysis of the information recorded is performed in view of information relating to one or more other user interactions by one or more other users with the object. Based on the analysis, a credibility score for the first user is determined. The credibility score represents a degree of confidence in reliability of the first user to recommend the object. Presentation of user recommendations for objects is controlled based on credibility scores to decrease impact of astroturfing, crowdturfing and spamming on the presentation.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to recommendation systems, and more particularly, a recommendation system for detecting correctness of a recommendation. One embodiment provides a method for determining credibility of a user in recommending an object. The method comprises monitoring activity relating to an object in an online network, and determining a baseline of activity for the object based on the activity monitored. In response to detecting a user interaction by a first user with the object, information relating to the user interaction is recorded. The information recorded includes at least one of the following: length of time of the user interaction, degree of user engagement with the object during the user interaction, amount of the object the user interaction involved, and degree of user usage of the object during the user interaction. An analysis of the information recorded is performed in view of information relating to one or more other user interactions by one or more other users with the object. Based on the analysis, a credibility score for the first user is determined. The credibility score represents a degree of confidence in reliability of the first user to recommend the object. Presentation of user recommendations for objects is controlled based on credibility scores to decrease impact of astroturfing, crowdturfing and spamming on the presentation.

In this specification, let the term "online network" generally denote an online collaboration system, an online social network, an online retailer, an e-commerce application, or an online content provider, such as Microsoft Exchange Server®, Facebook®, Yelp®, Amazon®, Netflix®, Twitter®, etc. Let the term "object" generally denote an object or a topic of discussion that one or more users can interact with and post comments of on an online network. Examples of an object include a product available for sale, media content (e.g., movie, television program, album, etc.), a place to visit or a place of business (e.g., a restaurant, an amusement park, a retail store, etc.), etc.

Recommendations are a powerful tool for agreeing or disagreeing to the mode of a topic, sharing a topic with others, commenting on a topic, or promoting a topic. In view of the rise of astroturfing, crowdturfing and spamming on online networks in recent years, there is a need to more effectively capture the efficacy/correctness of a recommendation of a user such that there is an implied trust that the user has impartially evaluated the object. Embodiments of the invention provide a recommendation system for detecting correctness of a recommendation. The recommendation system may be integrated with existing online networks.

Figure 1:
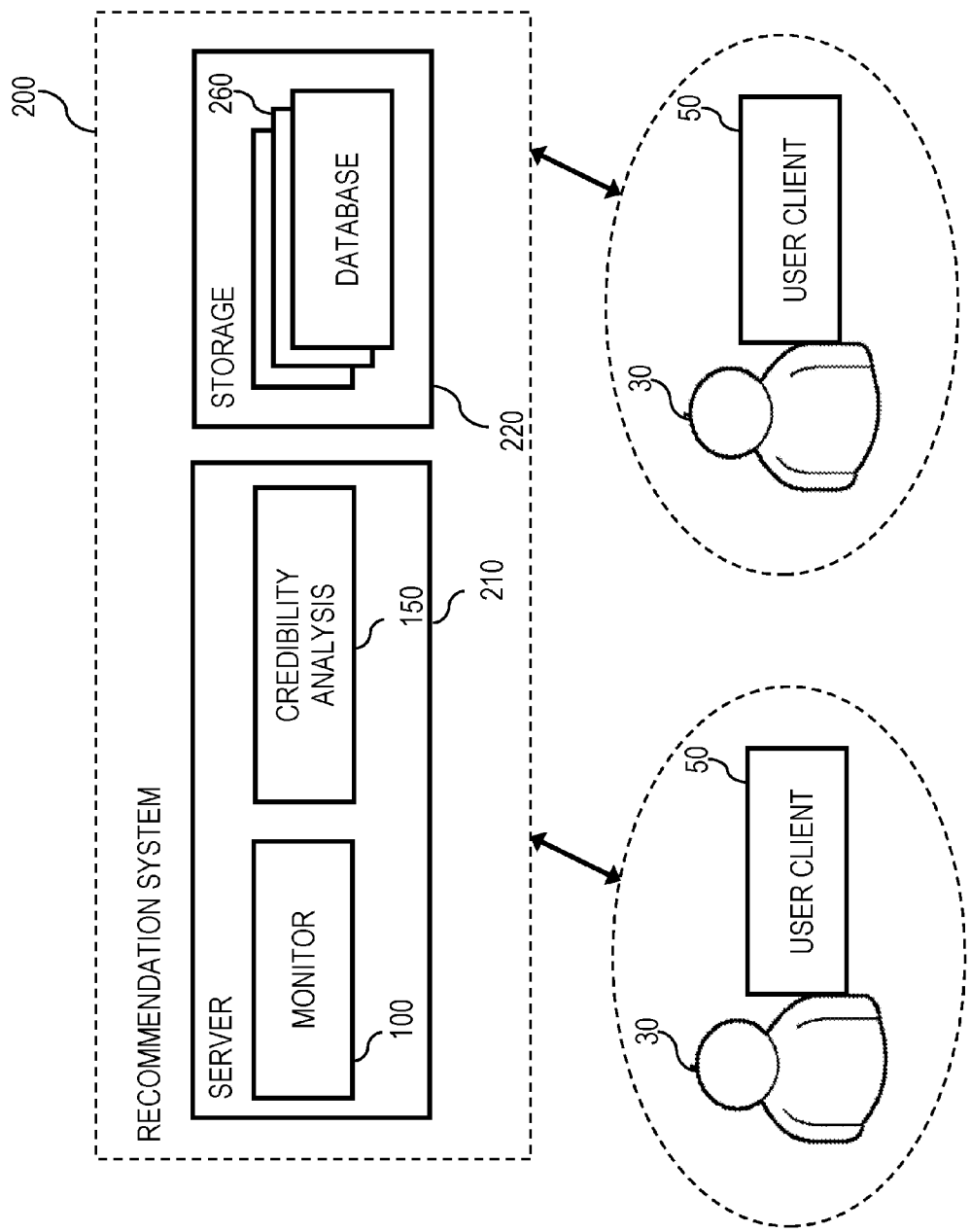
FIG. 1 illustrates an example recommendation system, in accordance with an embodiment of the invention.

FIG. 1 illustrates an example recommendation system 200, in accordance with an embodiment of the invention. The system 200 comprises one or more server devices 210, and one or more storage devices 220. The storage devices 220 maintain one or more databases 260. As described in detail later herein, one or more application units may execute/operate on the server devices 210, such as a credibility analysis unit 150 and a monitor unit 100.

A user 30 (e.g., an online user visiting an online social network or a website of an online retailer or online content provider) may access the system 200 using an electronic device ("user client") 50, such as a desktop computer, a laptop computer, a tablet, a mobile phone, etc. In one embodiment, each device 50 exchanges data with the system 200 over a connection (e.g., a wireless connection, a wired connection, or a combination of the two).

Figure 2:
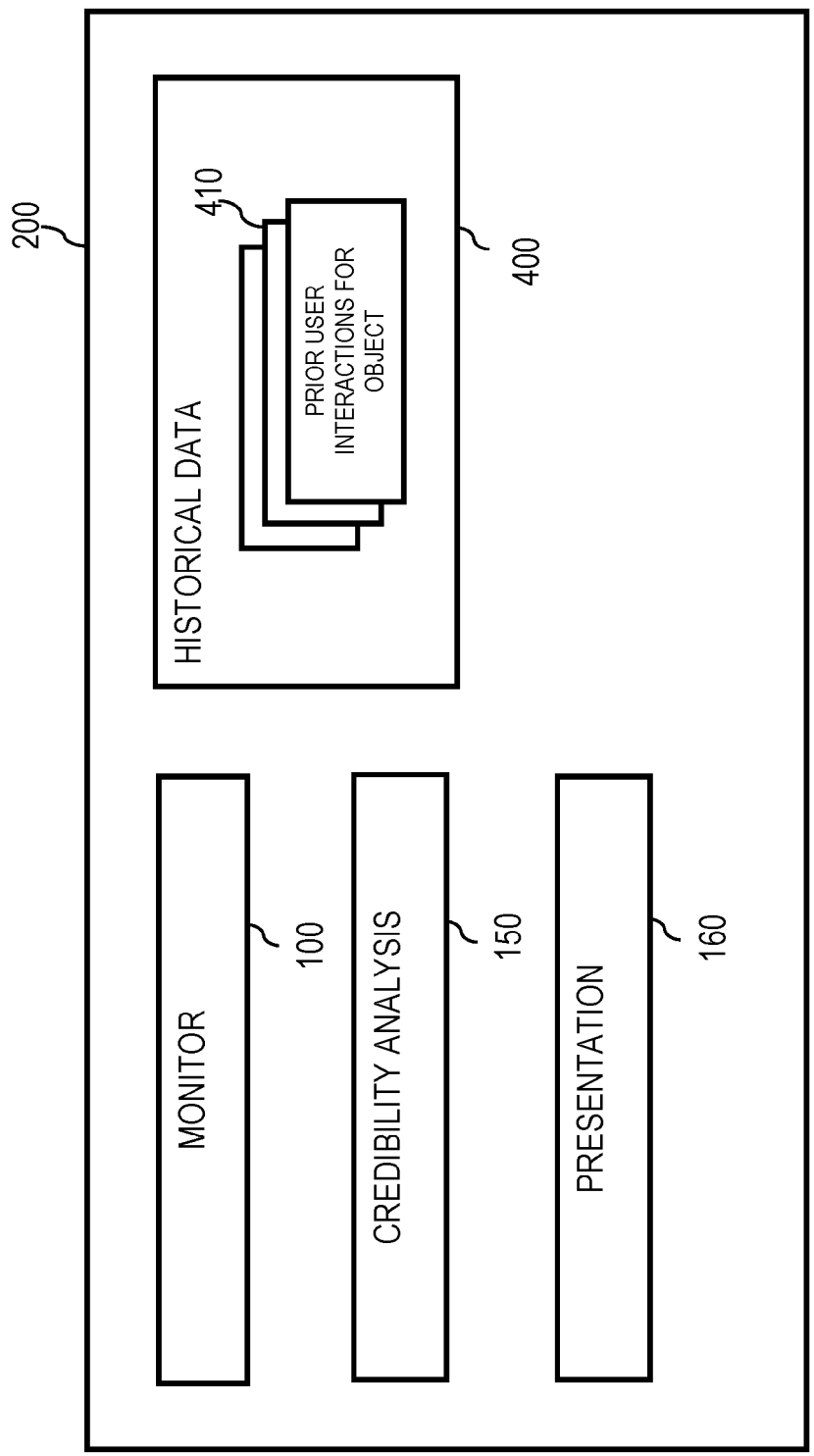
FIG. 2 illustrates the recommendation system in detail, in accordance with an embodiment of the invention.

FIG. 2 illustrates the example recommendation system 200 in detail, in accordance with an embodiment of the invention. In one embodiment, the system 200 maintains historical data of prior user interactions with objects that users 30 can interact with and post comments of on an online network. For example, the system 200 maintains a collection 400 of object data sets 410. Each object data set 410 corresponds to an object, and comprises information relating to prior user interactions with the object. In one embodiment, the collection 400 may be maintained on at least one database 260 (FIG. 1) of the storage devices 220 (FIG. 1).

The monitor unit 100 is configured to: (1) monitoring activity relating to an object, (2) determining a baseline of activity for the object based on the activity monitored, and (3) in response to detecting a user interaction by a user 30 with the object (e.g., detecting the user 30 has launched an object on an online network), recording information relating to the user interaction. The information recorded includes at least one of the following: length of time of the user interaction, degree of user engagement with the object during the user interaction, amount of the object the user interaction involved, and degree of user usage of the object during the user interaction.

The credibility analysis unit 150 is configured to: (1) in response to detecting a user interaction by a user 30 with an object, perform an analysis of information recorded relating to the user interaction in view of information relating to one or more other user interactions by one or more other users 30 with the object (i.e., analyze the user interaction against prior user interactions by other users 30), and (2) based on the analysis, determining a credibility score for the user 30. The credibility score represents a degree of confidence in reliability of a user 30 to recommend an object. The credibility analysis unit 150 utilizes the historical data maintained in the collection 400 when performing an analysis.

The credibility analysis unit 150 is further configured to detect submission of a recommendation by a user 30. The system 200 may rely on a governance or compliance interface that fires off a backend compliance event that notifies there is a new recommendation, and/or a Web Proxy that intercept traffic to a set API using a set key for an object which is liked/recommended.

The system 200 further comprises a presentation unit 160 configured to control presentation of user recommendations for objects on an online network based on credibility scores to decrease impact of astroturfing, crowdturfing and spamming on the presentation.

In one embodiment, for objects that are products, the system 200 may monitor or retrieve, via an online network, one or more items indicating user usage of an object recommended by a user 30.

For example, the system 200 may operate as follows: Assume a user 30 is a member of an online network. In response to the user 30 launching an object on the online network (e.g., the user 30 reads a first chapter of a book), the system 200 records information relating to the user interaction (e.g., words, language and/or items the user 30 reads in the first chapter). If the user 30 is frustrated with the object, the user 30 posts a negative review. The system 200 detects the submission of the negative review, and analyzes the user interaction to determine a credibility score of the user 30 (e.g., the system 200 correlates words in the book against actions of the user 30; if the system 200 determines that the negative review is without the insight, the system 200 re-weights the negative review such that it is less prominent on the online network, and may prompt the user 30 to re-read the first chapter of the book).

In one embodiment, the invention determines the likelihood a user 30 has completed reading/viewing an object (e.g., readable content, video, etc.) If the system 200 determines the likelihood is below a threshold, the system 200 may send an astroturfing warning (e.g., to the user 30 or an administrator).

In one embodiment, if the object is a video, the monitor unit 100 is configured to record the following information relating to a user interaction with the video: whether the video was ejected/abandoned (i.e., left without completing or left at a set time before completion), fast forwarded, rewound, stopped, viewed, paused, replayed, etc. The user interaction may be monitored through eye gaze, mouse tracking, etc.

In one embodiment, if the object is readable content, the monitor unit 100 is configured to record the following information relating to a user interaction with the readable content: reading speed, level of engagement, reading progress, textual content, etc.

In one embodiment, the system 200 may view recommendations for any object as a heatmap with dimensions related to time and credibility.

In one embodiment, the system 200 may utilize embedded tags for objects.

Figure 3:
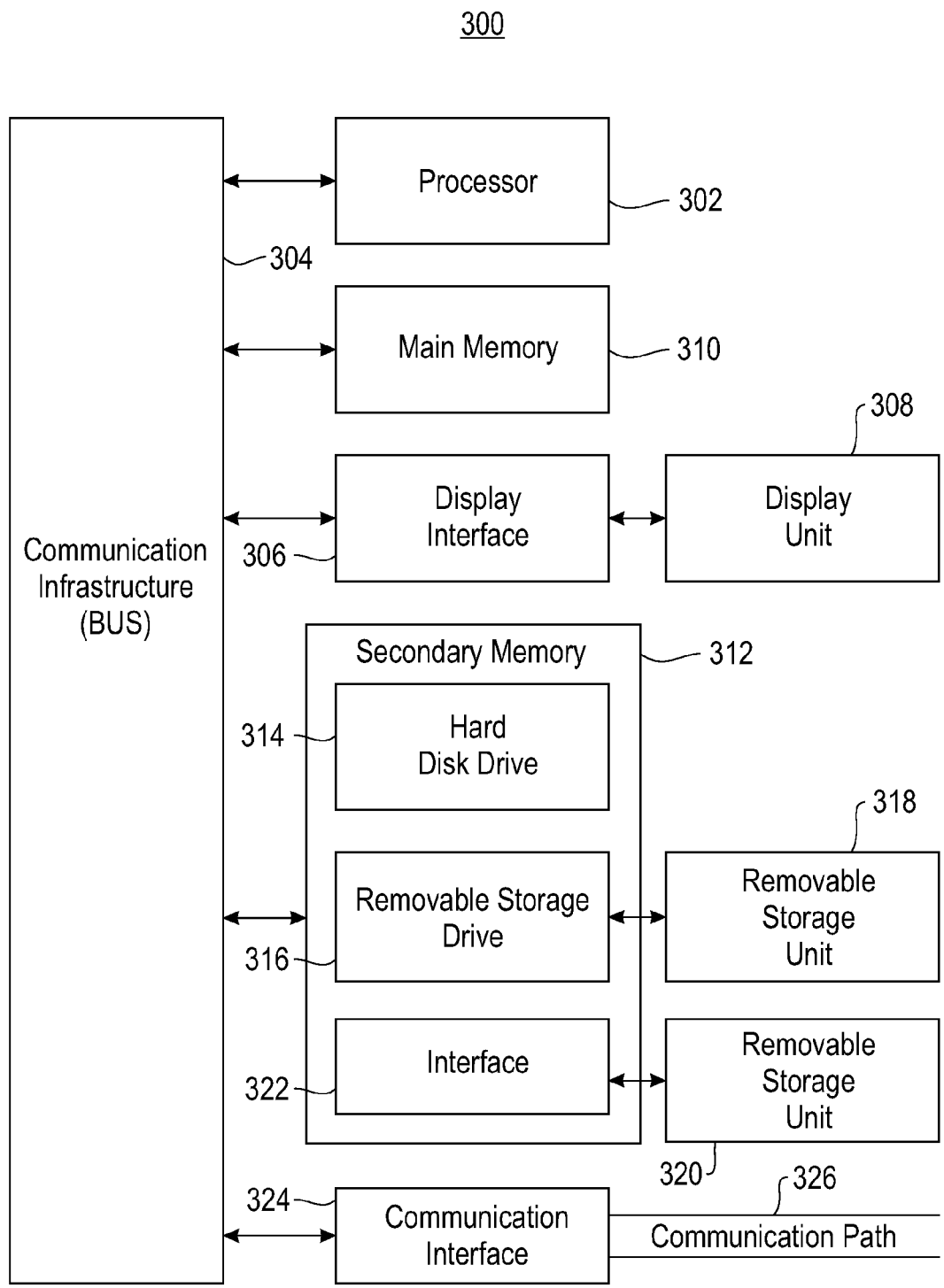
FIG. 3 is a high level block diagram showing an information processing system useful for implementing an embodiment of the present invention.

FIG. 3 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
on at least one processor:
monitoring activity relating to an object in an online network;
maintaining, on at least one storage device, historical data indicative of one or more prior user interactions with the object based on the activity monitored;
determining a baseline of activity for the object based on the activity monitored;
in response to detecting a user interaction by a first user with the object, recording information relating to the user interaction, wherein the information recorded includes at least one of the following: length of time of the user interaction, degree of user engagement with the object during the user interaction, amount of the object the user interaction involved, and degree of user usage of the object during the user interaction; and
in response to detecting a submission of a user recommendation from the first user for the object:
performing an analysis of the information recorded in view of the historical data; and
based on the analysis, determining a credibility score for the user recommendation, wherein the credibility score represents a degree of confidence in reliability of the first user to recommend the object;
wherein, the object comprises readable content or a video, the method further includes:
on the at least one processor:
determining a likelihood that the first user completed reading or viewing the object; and
sending an astroturfing warning to one of the first user or an administrator of the online network in response to determining the likelihood is below a pre-determined threshold;
wherein, the object comprises readable content, the method further includes:
on the at least one processor:
recording reading speed, reading progress, and textual content indicative of words, language, or items read by the first user during the user interaction;
correlating words included in the readable content against the textual content recorded to determine whether the user recommendation is credible; and
prompting the first user to re-read the readable content in response to determining the user recommendation is not credible; and
wherein presentation and prominence of user recommendations for objects displayed on an electronic device is controlled based on credibility scores to decrease impact of astroturfing, crowdturfing, and spamming on the presentation.

* * * * *